H. P. BROWN.
NON-SKIDDING DEVICE.
APPLICATION FILED JAN. 30, 1909.
965,621.
Patented July 26, 1910.
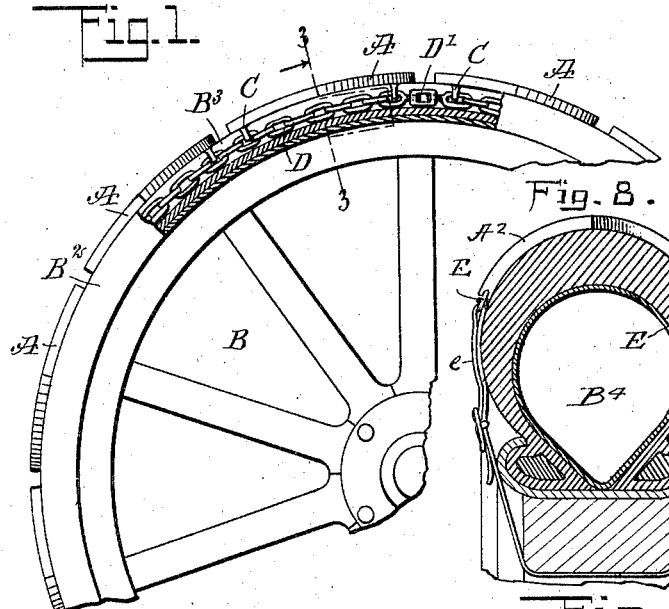
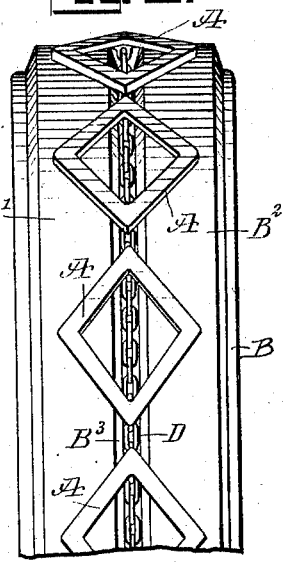
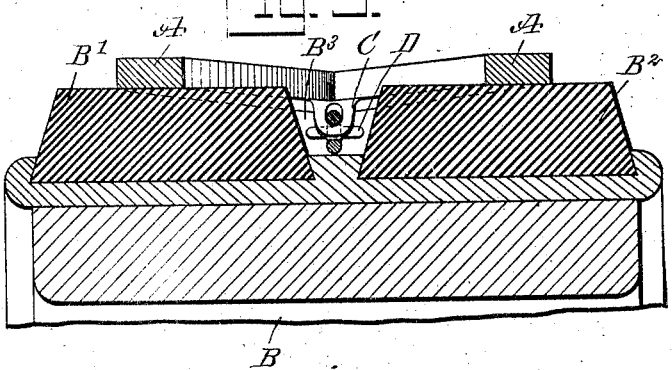
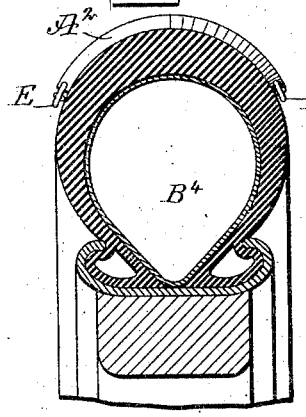
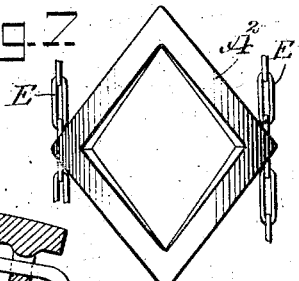
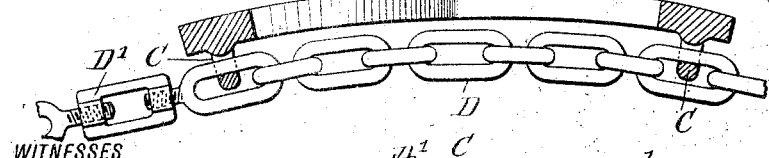
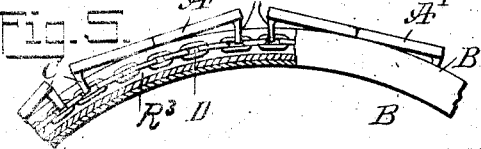
WITNESSES
INVENTOR
Henry P. Brown
BY Munn & Co.
ATTORNEYS

UNITED STATES PATENT OFFICE.

HENRY PETERSON BROWN, OF MOUNT VERNON, NEW YORK, ASSIGNOR, BY DIRECT AND MESNE ASSIGNMENTS, TO GENERAL DEVICE MANUFACTURING COMPANY, OF NEW YORK, N. Y., A CORPORATION OF NEW YORK.

NON-SKIDDING DEVICE.

965,621.          Specification of Letters Patent.        Patented July 26, 1910.

Application filed January 30, 1909. Serial No. 475,093.

*To all whom it may concern:*

Be it known that I, HENRY PETERSON BROWN, a citizen of the United States, and a resident of Mount Vernon, in the county of Westchester and State of New York, have invented a new and Improved Non-Skidding Device, of which the following is a full, clear, and exact description.

The object of the invention is to provide a new and improved non-skidding device for attachment to the wheels of power-driven trucks, automobiles and other power vehicles, and arranged to provide a continuous non-slipping surface, to permit convenient, quick and secure attachment of the device to a vehicle wheel, and to render the device exceedingly strong and durable.

In order to attain the desired result, use is made of quadrilateral links, connected with each other at their under faces by a chain or like flexible connection engaging the annular space between the tread sections of a power-driven truck wheel, thus providing a center attachment for the links.

A practical embodiment of the invention is represented in the accompanying drawings forming a part of this specification, in which similar characters of reference indicate corresponding parts in all the views.

Figure 1 is a side elevation of the improvement as applied to a wheel of a power-driven truck, parts being in section; Fig. 2 is a face view of the same; Fig. 3 is an enlarged cross section of the same on the line 3—3 of Fig. 1; Fig. 4 is an enlarged detail view, the link being in section and the chain in side elevation; Fig. 5 is a side elevation of a modified form of the improvement as applied to a truck wheel, parts being in section; Fig. 6 is a transverse section of the improvement as applied to an ordinary automobile wheel; Fig. 7 is a plan view of a link and a means for side attachment to a wheel, and Fig. 8 is a transverse section of the improvement applied to a wheel and showing a fastening device for securing it to the tire of the wheel.

The links A of the non-skidding device shown in Figs. 1, 2, 3 and 4 are quadrilateral in form, and the links are placed one in front of the other around the entire peripheral face of the wheel B, to form practically a continuous non-skidding surface. The links A are arranged with corners adjacent along the middle of the peripheral face of the wheel B, that is, diagonals of adjacent links A are in alinement in the direction of the travel of the wheel, as will be readily understood by reference to Fig. 2. In order to connect the links A with each other, each link is preferably provided with depending eyes C at the forward and rear corners, and the eyes C loosely engage corresponding links of an endless chain D or other flexible connection employed for connecting the links with each other around the entire peripheral face of the wheel B. The chain D is preferably provided with a turn buckle D' (see Figs. 1 and 4) to permit the taking up of any slack that may be in the chain. Now when the non-skidding device described is to be applied to the wheel B of a power-driven truck, having each wheel provided with two tread sections B' and B², spaced apart to form an annular recess B³, then the chain D or other flexible connection fits into the recess B³, thus holding the links A in position on the treads B', B², that is, each link extends equally onto both tread sections B', B², as will be readily understood by reference to Fig. 2. Thus by the arrangement described a central attachment of the non-skidding device to the wheel is had without requiring means for holding the skidding device in place on the wheel.

The links A, as shown in Fig. 1, are bent in a longitudinal direction, to conform to the shape of the peripheral face of the wheel B, but the links A' may be left flat, as indicated in Fig. 5, and in case the non-skidding device is applied to an ordinary automobile wheel B⁴, as shown in Fig. 6, then each link A² is curved in a transverse direction to conform to the tire, and in this case a side attachment is used, that is, the links are connected at their side corners with each other by longitudinally-extending chains E, as plainly indicated in Figs. 6 and 7. Any suitable fastening device around the inner face of the tire of the wheel B⁴ may be employed, to secure the non-skidding device in position on the tire of the wheel B⁴.

In Fig. 8 a fastening device in the form of a strap *e* is shown.

It is understood that by using links of the character described and connecting the same with each other by a flexible connection, an exceedingly simple, strong and durable skidding device is provided and which can be readily attached to a wheel, and when so attached forms practically a continuous surface to prevent skidding of the wheel.

Having thus described my invention, I claim as new and desire to secure by Letters Patent:

1. A non-skidding device for vehicle wheels comprising open quadrilateral links one in front of the other, diagonals of adjacent links being in alinement in the direction of travel of the wheel, and flexible means for connecting the links and securing them upon a wheel, the connection of the links with said means being on the under sides of the said links and at diametrically opposite corners.

2. A non-skidding device for vehicle wheels, comprising open quadrilateral links provided with eyes on their under sides at opposite corners, the links being arranged one in front of the other with the diagonals of adjacent links in alinement in the direction of travel of the links, and flexible means for connecting the links and securing them upon a wheel, said means loosely engaging the eyes of the links.

3. A non-skidding device for vehicle wheels, provided with open quadrilateral links one in front of the other, diagonals of adjacent links being in alinement in the direction of the travel of the links, a chain extending beneath the links and with which the said links are loosely connected, and means for taking up the slack of the chain.

4. A non-skidding device for vehicle wheels, provided with open quadrilateral links one in front of the other, diagonals of adjacent links being in alinement in the direction of the travel of the links, each link being provided with closed eyes on their under sides at diametrically opposite corners, and an endless chain loosely engaging the said eyes.

5. In combination, a power-driven truck wheel having a tread provided with an annular recess between the tread faces, a flexible connection in the said annular space, open quadrilateral links one in front of the other and overlying the said tread faces, adjacent links having their diagonals in alinement in the direction of the travel of the wheel, and means on the under sides of the links for flexibly connecting the said links with the said chain at diametrically opposite corners.

In testimony whereof I have signed my name to this specification in the presence of two subscribing witnesses.

HENRY PETERSON BROWN.

Witnesses:
FRANK A. KATELEY,
H. C. FORDHAM.